United States Patent [19]
Mirsky

[11] 3,803,550
[45] Apr. 9, 1974

[54] MOUNTING ASSEMBLY FOR VEHICLE TIRE PRESSURE MONITORING DEVICE

[75] Inventor: Alexander Mirsky, Baildon, England

[73] Assignee: Heenan Aspa Limited, Worcester, England

[22] Filed: June 7, 1972

[21] Appl. No.: 260,414

[30] Foreign Application Priority Data
June 7, 1971    Great Britain.................. 19170/71
Sept. 15, 1971   Great Britain.................. 43106/71

[52] U.S. Cl.............................. 340/58, 200/61.22
[51] Int. Cl......................................... B60c 23/02
[58] Field of Search......... 340/58; 200/61.22, 61.25

[56] References Cited
UNITED STATES PATENTS
2,860,321   11/1958   Strickland et al.................. 340/58

Primary Examiner—Alvin H. Waring
Attorney, Agent, or Firm—Edward F. Welsh

[57]   ABSTRACT

In order to mount an object such as a tire pressure monitoring device on a vehicle road or landing wheel, the object is mounted on a mounting member which is in turn secured to the wheel by using one or more wheel nuts which hold the wheel on a hub in the normal manner but also pass through apertures in the mounting member and have projecting flanges which secure the mounting member on the wheel; a resilient member is used between the mounting member and the wheel so that the force applied to the mounting member is a resilient force, enabling the wheel nut to be tightened fully onto the wheel.

11 Claims, 6 Drawing Figures

MOUNTING ASSEMBLY FOR VEHICLE TIRE PRESSURE MONITORING DEVICE

This invention relates to mounting any suitable object on a road or landing wheel of a vehicle (which vehicle may be an aircraft). The object may be a part of a pneumatic tire pressure indicating system and in particular an automatic tire pressure monitoring system for the wheels of vehicles (including aircraft) with special, although not exclusive reference to the rear wheels of lorries, tractor-drawn trailers and public transport vehicles. Examples of such tire pressure monitoring systems are described in British Pat. Spec. Nos. 1 021 743, filed July 24 1963 published: Mar. 9 1966 1 129 021, filed: May 18 1966, published: Oct. 2 1968; 1 176 945, filed Sept. 14 1967 published: Jan. 7 1970 1 176 946 filed: Sept. 14 1967, published: Jan. 7 1970; and 1 259 613, filed: Oct. 22 1969, published: Jan. 5 1972. However, any suitable object can be mounted on the wheel, for instance an extension hose leading to the valve stem of the tire (or extension hoses leading to the valve stems of twin tire), a tire pressure sensitive device without a radio (giving a visible or audible indication on the wheel) or another monitoring device for monitoring conditions other than tire pressure e.g., for measuring temperature, such as the thermocouple measurement of brake drum, brake disc or disc pad temperature.

This invention provides a mounting assembly or kit for mounting any suitable object on a vehicle road or landing wheel, the mounting assembly or kit including:

a mounting member having at least one aperture therethrough through which at least the front end portion of a wheel nut can pass, and means for preventing rotation of the mounting member about the aperture when retained by a wheel nut passing in part through the aperture, at least one wheel nut which has a protruding surface spaced from the front end of the nut, and of such a size that the front end portion of the nut will pass through the aperture in the mounting member until the protruding surface, which will not pass through the aperture in the mounting member, engages the mounting member, and a resilient member which enables the wheel nut to be fully tightened to secure the wheel on the hub and also enables the mounting member to be secured firmly to the wheel by the action of the protruding surface of the nut on the mounting member.

The invention extends to a road or landing wheel having a suitable object mounted thereon by means of the mounting member, the object being secured to the mounting member and the mounting member being secured to the wheel by means of at least one wheel nut which has a protruding surface spaced from the front end of the nut, passing partly through a corresponding aperture in the mounting member, through which the protruding surface itself will not pass, the protruding surface securing the mounting member on the wheel, and a resilient member being provided to enable the wheel nut to be fully tightened to secure the wheel on the hub and also to enable the mounting member to be secured firmly to the wheel by the action of the protruding surface of the wheel nut on the mounting member, the wheel also being secured on the hub by nuts which do not secure the mounting member on the wheel.

The invention also provides a wheel nut for retaining a vehicle road or landing wheel on its hub by engaging a threaded stud on the hub and for projecting through an aperture in a mounting member to retain the mounting member on the wheel, the wheel nut having:

a front end portion whose front end has an inclined surface of revolution (usually a cone) for engaging the wheel, which front end portion is long enough to project through the mounting member, a surface protruding radially beyond the front end portion, for engaging behind the mounting member and retaining the mounting member on the wheel, and a rear end portion behind said protruding surface, the rear end portion being provided with faces for engagement by a tool for tightening and loosening the wheel nut.

The front end of the wheel nut is the end nearer the wheel hub.

The mounting member can be secured to the wheel without removing all the wheel nuts, and does not require any modification of the wheel nave and hub design, and only requires a small modification of some or all of the wheel nuts. Furthermore, no part need be inserted between the wheel-clamping portion (the front end portion) of the wheel nut and the wheel.

In addition, the invention can enable an unskilled person to apply and remove the mounting member assembly without requiring special tools, and wheel changes need not involve much more work than is normal in wheel changing. Free access to the wheel nuts by a box spanner for periodic tightening of the nuts can be ensured and the whole mounting member assembly can be mounted in a plane providing protection against damage or theft, i.e., within the recess provided by the wheel hub. Further, the mounting member assembly may be made to be universally applicable to all or most vehicle rear road wheels having a common wheel stud pitch circle diameter.

Said means for preventing rotation of the movable member about the aperture will normally be at least one further aperture through which at least the front portion of a wheel nut can pass, and apertures will be positioned to register with corresponding wheel studs so that a further wheel nut prevents rotation of the mounting member. The mounting member may be in the form of a complete annulus or say a part annulus, and in general it is desirable that the mounting member be secured by two or more nuts having said protruding surfaces. It is also desirable that the wheel remains secured by sufficient wheel nuts without said protruding surface to enable the mounting member to be secured to the wheel while leaving the wheel safely secured to the hub by nuts which are not removed - this enables the mounting member to be secured to the wheel without jacking the wheel up. It may be sufficient to provide only two diametrically-opposed nuts with said protruding surfaces for retaining the mounting member.

The protruding surface on the wheel nut may be a flange around the nut, leaving enough room at the rear (free) end of the nut for engagement by a wheel spanner. The flange is preferably forged integrally with the wheel nut, but could be for instance welded on. A useful shape for the wheel nut is one in which the rear portion is hexagonal, the front portion is cylindrical, the diameter of the cylindrical front portion being substantially less than the distance between opposite edges of the rear portion (and preferably being approximately equal to the distance between opposite flats of the rear portion), and the front and rear portions can be separated by an annular flange whose diameter is substantially greater than the diameter of the front portion (and preferably substantially greater than the distance between opposite edges of the rear portion).

Wheel nuts normally have a through-bore which is threaded for screwing onto a wheel stud; the wheel nut of the invention may have an end closure for the bore at its rear end, for instance a disc pressed into the end of the bore.

The resilient member is preferably arranged to be positioned between the mounting member and the wheel, and may have a shape (looking axially of the wheel) substantially the same as that of the mounting member. However, the resilient member(s) may alternatively only be positioned adjacent said object(s), e.g. casings or housings containing components of the say tire pressure monitoring device, and the resilient member may be a pad secured, e.g., stuck, to the object itself if the object is suitably positioned. The resilient member may be made of rubber, e.g. neoprene, of suitable compressibility.

The assembly may include means for mounting a source of electric current supply, a pneumatic transducer, a radio frequency transmitter arranged to be energised by the transducer and at least one pipe for providing air communication between a pneumatic tire and the transducer.

The mounting member may have one or more additional apertures for mounting said object(s) — the object may have a projection such as a flange which is held behind the mounting member, the object protruding out through the aperture in the mounting member.

It is desirable to be able to mount such objects on a vehicle road or landing wheel without requiring wheel or vehicle modification, and the arrangement should if possible in no way interfere with the customary maintenance of wheels and provide easy access to the inflation point.

The invention will now be further described, by way of example, with reference to the accompanying drawings, in which.

Figure 1:
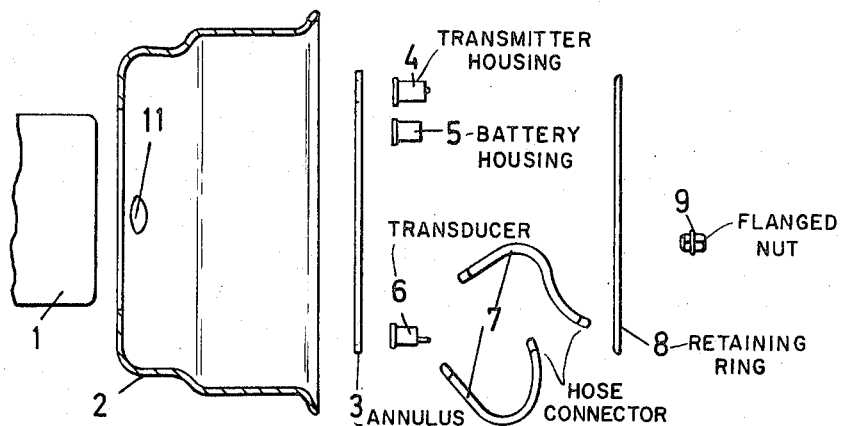
FIG. 1 is a diagrammatic exploded view of parts of a mounting assembly in accordance with the invention and certain other components.

Referring to the drawings, the parts shown in FIG. 1 include a wheel hub 1, a wheel 2, a resilient member in the form of a compressible annulus 3, a radio frequency transmitter housing 4, a battery housing 5, a pneumatic transducer 6, two pipe or hose connectors 7, a mounting member in the form of a retaining ring 8 and one wheel-securing flanged nut 9. The retaining ring 8 has a number of equi-spaced, identical apertures therein corresponding to the wheel studs on the wheel hub 1; an ordinary unflanged wheel nut can pass through each aperture so that the retaining ring 8 could be placed over the wheel nuts of a wheel properly mounted on the hub.

Figure 4:
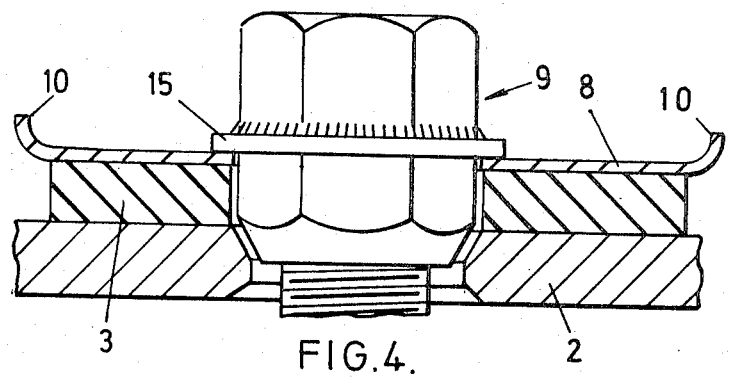
FIG. 4 is a section along the line IV—IV of FIG. 2, on an enlarged scale.

The retaining ring may be a pressing with edges lipped at 10, as shown in FIG. 4.

Figure 2:
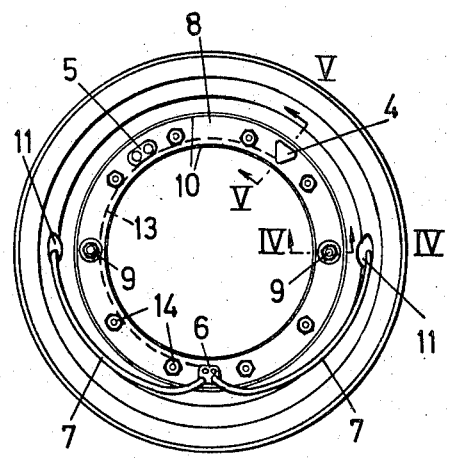
FIG. 2 is an elevation showing assembled the assembly and components of FIG. 1.

Tire valve access holes 11 are shown in FIGS. 1 and 2, the system being applicable to a single wheel when only one hose connector is required or to twin wheels when two hose connectors are provided. When a hose connector is fitted, the air pressure in a tyre is directly communicated to the pneumatic transducer 6.

Figure 3:
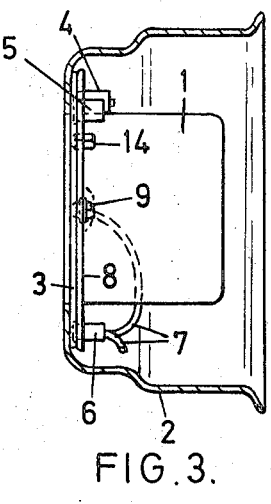
FIG. 3 is a side elevation of FIG. 2.
Figure 5:
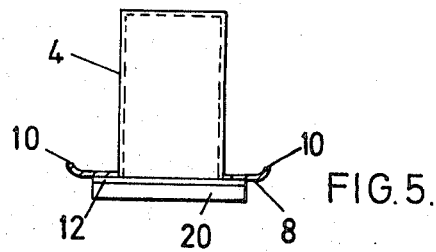
FIG. 5 is a section along the line V—V of FIG. 2, on a different scale to that of FIG. 4, and showing a modification.

As shown in FIGS. 2, 3 and 5, the transmitter housing 4, the battery housing 5 and the pneumatic transducer 6 are held in compression between the retaining ring 8 and the annulus 3, the housings 4, 5 and the transducer 6 having suitable protruding flanges 12. If desired, the housings 4, 5 and the transducer 6 may be permanently secured to the retaining ring 8. A conductor lead 13, shown in broken lines in FIG. 2 and connecting the transducer 6 to the housings 4 and 5, is positioned between the ring 8 and the annulus 3 and is thus protected. If desired, the hose connectors 7 may be similarly positioned although, as shown in the drawings, they are disposed externally of the ring 8 and annulus 3.

Two or more of the flanged nuts 9 clamp the parts together, as shown in FIG. 4, the flange on the nut pressing on the retaining ring 8 and causing compression of the annulus 3. The resilient force caused by the compression of the annulus 3 holds the retaining ring 8 firmly in position although the main (substantially non-resilient) clamping force of the flanged nuts 9 is applied directly to the wheel 2 to help secure the wheel in position. However, at least half the wheel nuts are wheel nuts 14 with no flanges, these wheel nuts 14 passing through the apertures in the retaining ring 8; these wheel nuts 14 are sufficient to hold the wheel 2 of the stationary vehicle correctly in position while removing the remaining nuts to mount the retaining ring 8 in position.

Figure 6:
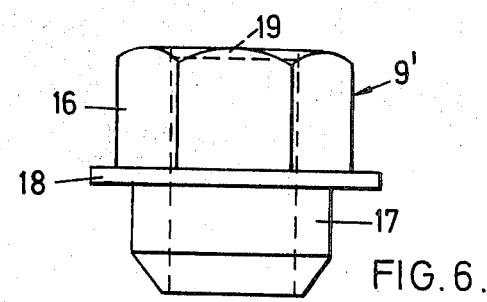
FIG. 6 is an elevation of a modified flanged nut.

One flanged wheel nut 9 is shown clearly in FIG. 4. The wheel nut 9 is an ordinary wheel nut to which a flange 15 has been welded to provide a protruding surface, or the same shape may be provided by forging. Another flanged wheel nut 9' is shown in FIG. 6. As for the nut 9, the rear end portion 16 is hexagonal, but the front end portion 17 is cylindrical having a diameter approximately equal to the distance between the flats of the hexagonal portion 16, the front end of the cylindrical portion 17 being conical, and a flange 18 divides the rear and front portions 16, 17; the nut 9' can be formed integrally in a forging operation. The threaded bore through the nut (shown in broken lines) has its rear end closed by a pressed in disc 19 which rests on a short counterbore in the rear of the nut 9'.

The dimensions of the retaining ring 8 and its apertures must relate to the pitch circle diameter of the wheel studs. In the case of wheels having ten studs, 335 mm is a broadly used international standard, but a corresponding design may be used in the case of wheels having pitch circle diameters other than 335 mm, e.g., for six or eight or more than ten stud wheels.

If, as is shown in the drawings, any of the unflanged wheel nuts 14 project through the mounting member, it may be necessary to have those unflanged nuts longer than normal ones, to allow for the thickness of the mounting member and to enable the nut to protrude far enough for proper engagement by a wheel spanner. Thus all the nuts would have to be changed when initially securing the retaining ring on the wheel, but this can be done one by one without jacking up the wheel.

As shown in FIG. 5, it is not essential to have the resilient member in the form of an annulus. As a modification, the transmitter housing 4 of FIG. 5 has a small resilient pad 20 stuck to its base, and the housing 5 and transducer 6 can have similar pads.

The wheel 2 illustrated has its nave secured direct to the hub 1. The wheel could however be of the type having a demountable rim secured to spokes by clamps and nuts corresponding to the nuts 9 and 14; the spokes may either be integral with or be bolted onto the hub.

In operation of the system, loss of tire pressure will be communicated to the pneumatic transducer 6 and a current flows which serves to energise a radio frequency transmitter contained in the housing 4. The resulting signal is detected by a receiver positioned at any convenient point in the vehicle and the detected signal amplified and utilised to operate a visual or an aural warning device.

I claim:

1. A vehicle road or landing wheel secured to a wheel hub having a plurality of projecting, externally screw-threaded, wheel-securing studs, said studs projecting through corresponding apertures in said wheel and internally threaded wheel nuts being screwed onto said studs and having front portions engaging said wheel to secure said wheel on said hub, said wheel having tire pressure monitoring components mounted thereon by means of a mounting assembly comprising:

a mounting member having an aperture therethrough through which a said wheel stud projects, whereby said mounting member retains said tire pressure monitoring components in place, a wheel nut screwed onto the wheel stud projecting through the aperture in the mounting member said wheel nut having a front portion passing through said aperture in said mounting member and engaging said wheel, and a rear portion having a radially-protruding surface between the front portion and the rear portion which surface engages said mounting member and secures said mounting member to said wheel, a resilient member which applies a force to said mounting member upon tightening said wheel nut fully against said wheel, thereby holding said mounting member firmly in position on said wheel, and means for preventing rotation of said mounting member about said aperture therein, the remainder of said wheel nuts not having a radially protruding surface whereby the mounting member may be installed or removed without removing all of the wheel nuts securing the wheel to the hub.

2. A wheel as claimed in claim 1 wherein said rotation preventing means comprises another aperture in said mounting member through which another wheel stud projects and a wheel nut having said radially protruding surface screwed onto said wheel stud the front portion of said wheel nut passing through said aperture and engaging said wheel and said surface engaging said mounting member.

3. A wheel as claimed in claim 1, wherein said mounting member is in the form of a complete annulus.

4. A wheel as claimed in claim 1, wherein said mounting member is secured by two or more said nuts having said radially-protruding surface.

5. A wheel as claimed in claim 1, wherein said radially-protruding surface on said wheel nut is provided by a flange around the nut, leaving enough room at the rear end of the nut for engagement by a wheel spanner.

6. A wheel as claimed in claim 1, wherein said wheel nut having said radially-protruding surface has a hexagonal rear portion and a cylindrical front portion, the diameter of the cylindrical front portion being substantially less than the distance between opposite edges of the rear portion, and the front and rear portions being separated by a flange which provides said radially-protruding surface, said flange being annular with a diameter substantially greater than the diameter of the front portion.

7. A wheel as claimed in claim 1, wherein said resilient member is positioned between said mounting member and said wheel.

8. A wheel as claimed in claim 1 wherein said resilient member is a pad secured to at least one of said tire pressure monitoring components.

9. A wheel as claimed in claim 1 wherein said wheel carries a pneumatic tire and wherein said tire pressure monitoring comprise means for providing a source of electric current supply, a pneumatic transducer, a radio frequency transmitter for energization by said transducer and at least one pipe providing air communication between said pneumatic tire and said transducer.

10. A wheel as claimed in claim 1 wherein said mounting member has at least one additional aperture for mounting at least one of said tire pressure monitoring components, said component protruding out through said additional aperture and having a projection which is held behind said mounting member.

11. A wheel as claimed in claim 8 wherein said mounting member has at least one additional aperture for mounting at least one of said tire pressure monitoring components, said component protruding out through said additional aperture and having a projection which is held behind said mounting member.

* * * * *